United States Patent [19]

Sato et al.

[11] Patent Number: 4,791,084
[45] Date of Patent: Dec. 13, 1988

[54] HYDROCARBON CATALYTIC CRACKING CATALYST COMPOSITIONS AND METHOD THEREFOR

[75] Inventors: Goro Sato; Masamitsu Ogata; Takanori Ida; Tatsuo Masuda, all of Kitakyushu, Japan

[73] Assignee: Catalysts & Chemicals Industries Co., Ltd., Tokyo, Japan

[21] Appl. No.: 58,979

[22] Filed: Jun. 8, 1987

Related U.S. Application Data

[63] Continuation-in-part of Ser. No. 808,414, Dec. 12, 1985, abandoned.

[30] Foreign Application Priority Data

Dec. 21, 1984 [JP] Japan ................... 59-271199
Dec. 21, 1984 [JP] Japan ................... 59-271200
Dec. 21, 1984 [JP] Japan ................... 59-271201

[51] Int. Cl.$^4$ ................... B01J 29/06; B01J 27/18
[52] U.S. Cl. ................... 502/65; 502/64
[58] Field of Search ................... 502/64, 214, 65; 208/114

[56] References Cited

U.S. PATENT DOCUMENTS

| | | | |
|---|---|---|---|
| 4,222,896 | 9/1980 | Swift et al. | 502/64 |
| 4,228,036 | 10/1980 | Swift et al. | 502/64 |
| 4,379,761 | 4/1983 | Olson et al. | 502/214 |
| 4,430,199 | 2/1984 | Durante et al. | 208/114 |
| 4,454,241 | 5/1984 | Pine et al. | 502/68 |
| 4,460,698 | 7/1984 | Hensley, Jr. et al. | 502/64 |
| 4,465,780 | 10/1984 | Pine | 502/68 |
| 4,498,975 | 1/1984 | Pine et al. | 208/114 |
| 4,504,382 | 4/1984 | Pine | 208/114 |
| 4,567,162 | 1/1986 | Pine | 502/64 |
| 4,605,637 | 8/1986 | Chang et al. | 502/64 |
| 4,692,236 | 9/1987 | Sato et al. | 208/114 |

*Primary Examiner*—Carl F. Dees
*Attorney, Agent, or Firm*—Flynn, Thiel, Boutell & Tanis

[57] ABSTRACT

A cracking catalyst for hydrocarbons with superior selectivity to gasoline production and greater metals tolerance comprising a porous inorganic oxide matrix composited with a crystalline aluminosilicate zeolite and a phosphorus-containing alumina in the form of small lumps.

14 Claims, 3 Drawing Sheets

… … …

HYDROCARBON CATALYTIC CRACKING CATALYST COMPOSITIONS AND METHOD THEREFOR

CROSS REFERENCE TO RELATED APPLICATION

This application is a continuation-in-part of Ser. No. 808 414, filed Dec. 12, 1985.

BACKGROUND OF THE INVENTION

The present invention relates to hydrocarbon catalytic cracking catalyst compositions and in particular relates to catalyst compositions which exhibit high metal tolerance, maintain high catalytic activity and gasoline selectivity for a long period of time and can depress hydrogen and coke formation to a low level when used in catalytic cracking of heavy oil containing large amounts of heavy metals such as vanadium, nickel, iron, copper and the like and a method therefor.

Catalytic cracking of hydrocarbon originally aims at the production of gasoline. Therefore, catalysts used therefor are naturally demanded to exhibit high catalytic activity and gasoline selectivity, and further, metal tolerance.

In recent years, it is becoming necessary, with deterioration of the oil situation, to employ low grade heavy oils, typically residual oils, containing large amounts of heavy metals such as vanadium, nickel, iron, copper and the like as a feed stock for catalytic cracking. This attaches more importance to metal tolerance of catalytic cracking catalysts.

In catalytic cracking of heavy oils, the cracking activity and gasoline selectivity of the catalyst used therefor generally deteriorate more or less because of the deposit of metallic contaminants contained in feed oils on the catalyst. In view of this, it is customary that the usual commercially used catalytic cracking catalysts, exemplarily catalytic cracking catalysts comprising zeolite dispersed in porous inorganic oxide matrices, have such metal tolerance that they can maintain a satisfactory catalytic ability even when a certain degree of metals deposit thereon. However, in catalytic cracking of the above mentioned low grade heavy oils using the catalyst of this sort, it is impossible to achieve the primary object of catalytic cracking because a large amount of metallic contaminants admixed with said oils deposit on the catalyst whereby a dehydrogenation reaction is accelerated, formation of hydrogen and coke is increased, and further, the crystal structure of zeolite is apt to be destroyed.

Accordingly, when subjecting the low grade heavy oils containing a large amount of metallic contaminants to catalytic cracking, there have usually been employed the procedure of suppressing the deposited amount of metal per catalyst particle by increasing the amount of catalyst used, the procedure of preventing the deterioration of the catalytic activity caused by metal deposit by adding an antimony compound in the feed oil, or the like. However, these operational countermeasures can never be recommended because the running cost increases. On the other hand, as the countermeasure from the catalytic ability there has been known the one which comprises increasing the amount of zeolite to be dispersed in the catalyst in comparison with that in the normal catalytic cracking catalyst, and further, U.S. Pat. No. 4,430,199 discloses a catalytic cracking catalyst improved in metals tolerance by incorporating a phosphorus compound in a zeolite-containing catalytic cracking catalyst. Still further, U.S. Pat. No. 4,228,036 discloses a catalytic cracking catalyst prepared by dispersing zeolite in a matrix comprising alumina-aluminum phosphate-silica.

In addition, U.S. Pat. No. 3,711,422 describes that the addition of an antimony compound to a catalytic cracking catalyst deactivates the metallic contaminants deposited on said catalyst, and U.S. Pat. No. 4,183,803 describes a process for passivating metallic contaminants by contacting the metallic contaminants-deposited catalyst with a compound of antimony, bismuth, phosphorus or the like.

In addition, U.S. Pat. No. 4,222,896 proposes a catalyst comprising a $MgO-Al_2O_3-AlPO_4$ matrix composited with zeolite, and Japanese Laid Open Patent Application 150539/1984 proposes a catalyst comprising an alumina-magnesia matrix composited with zeolite, respectively. Of the usual catalytic cracking catalysts developed in order to improve metals tolerance thereof, the catalyst whose zeolite content has been increased can never be made a commercially attractive one. The catalyst containing a phosphorus component with or without antimony, bismuth, magnesium and the like is not necessarily satisfactory in metal tolerance. The phosphorus component and the above mentioned other metals are surely attributable to improvement in metals tolerance, but it is conjectured that the usual catalysts, wherein the phosphorus component and other metallic components are dispersed uniformly throughout the catalysts, can never obtain satisfactory results when too much metal deposits thereon because the metal tolerance of the catalysts deteriorates.

We have found that when an alumina-containing catalytic cracking catalyst is utilized for catalytic cracking of hydrocarbon oils and vanadium is deposited thereon, and when the spent catalyst is analyzed by means of an X-ray microanalyzer, the distribution of the deposited vanadium well corresponds to that of alumina. This fact suggests that when alumina is allowed to be present, taking the form of small particles or lumps, in the catalytic cracking catalyst, metallic contaminants can be deposited preferentially on these small particles or lumps of alumina.

SUMMARY OF THE INVENTION

The present invention provides a hydrocarbon catalytic cracking catalyst composition that comprises alumina particles having a particle diameter of 2–60 $\mu$m, particularly 10–60 $\mu$m, on which a phosphorus component has previously been fixed, with or without one or more kinds of auxiliary components selected from the group consisting of alkaline earth metals, rare earth metals, antimony, bismuth, boron, manganese and tin, a crystalline aluminosilicate zeolite and a porous inorganic oxide matrix. A more preferable particle diameter range for the alumina particles is from 15–60 $\mu$m and the most preferred diameter range is from 20–60 $\mu$m. Further, the present invention provides a method for preparing said catalyst compositions, and said method comprises spray drying an alumina particle on which a phosphorus component has previously been fixed, with or without an auxiliary component, a crystalline aluminosilicate zeolite and an aqueous slurry containing a precursor of a matrix. In the catalyst composition according to the present invention, the amount of said alumina particles on which a phosphorus component has previously been fixed, with or without an auxiliary component, may be controlled in the range of 5-75 wt. % of the catalyst composition, the amount of said aluminosilicate zeolite may be controlled in the range of 5-50 wt. % of the catalyst composition, and the amount of said porous inorganic oxide matrix may be controlled in the range of 20-50 wt. % of the catalyst composition, re- spectively.

DESCRIPTION OF THE PREFERRED EMBODIMENTS

Figure 1:
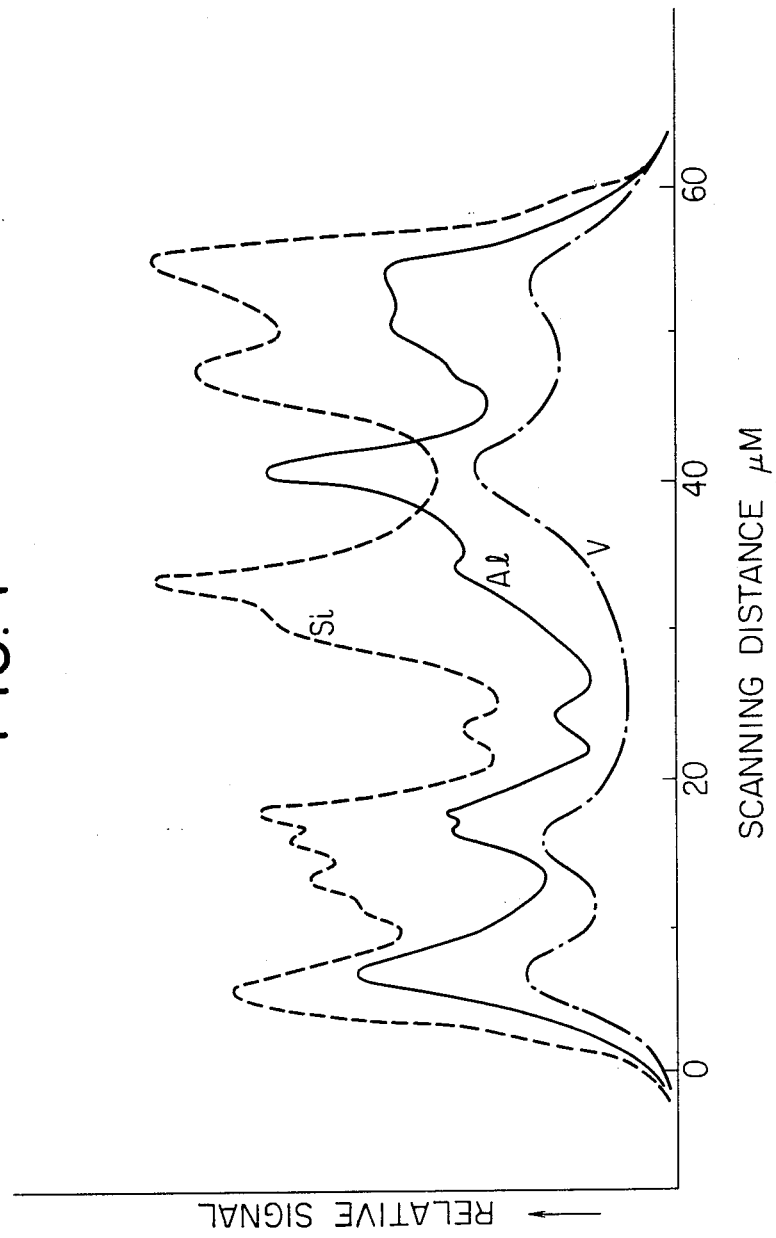
FIG. 1 is a graph obtained by analyzing Catalyst A, prepared in Example 1 referred to afterwards and used in Example 2, by means of an x-ray microanalyzer.

The alumina particle on which the phosphorus component is fixed, with or without the auxiliary component, must have a particle diameter in the range of 2-60 $\mu$m, preferably 10-60 $\mu$m. The reason is that when using a fine alumina particle whose particle diameter is smaller than this range, said alumina particle disperses uniformly in the catalyst composition without existing therein in the form of small lumps of alumina, while a particle diameter larger than said range is not preferable in connection with the average particle diameter of the finally obtained catalyst composition.

In view of this, the alumina particles of the present invention on which the phosphorus component has been fixed are prepared by the method of contacting a previously prepared alumina or alumina hydrate having a particle diameter of 2-60 $\mu$m, preferably 10-60 $\mu$m, with a phosphoric ion ($PO_4^{3-}$)-containing aqueous solution, drying and thereafter calcining the alumina particles, or by the method of contacting a coarse alumina particle or alumina hydrate with a phosphoric ion-containing aqueous solution, drying, calcining and thereafter pulverizing the same into a particle diameter of 2-60 $\mu$m, preferably 10-60 $\mu$m. When impregnating the alumina particle with the auxiliary component of the present invention together with the phosphorus component, it is possible to impregnate both components simultaneously using a mixed solution of a phosphoric ion-containing aqueous solution and an auxiliary component-containing aqueous solution, and it is also possible to impregnate both components separately. In the latter case, the order of impregnation does not matter, but it is preferable to dry the alumina and calcine it once after the first impregnation has been completed. In any case, as said phosphoric ion-containing aqueous solution, there can be used aqueous solutions of phosphoric acid, ammonium hydrogen phosphate, ammonium phosphate, ester phosphates or the like or their mixed solutions. As the auxiliary component-containing aqueous solution, there may be used, singly or in admixture, an aqueous solution of nitrate, carbonate, chloride or the like containing one or two kinds or more of alkaline earth metals, rare earth metals, antimony, bismuth, manganese and tin and an aqueous solution of boric acid.

The amount of the phosphorus introduced in the alumina particle having a particle diameter of 10-60 $\mu$m preferably is in the range of 0.6-12.2 wt. % (P/Al atomic ratio 0.01-0.20) based on alumina and calculated as elementary phosphorus, because in case said amount is less than this range, there is not displayed any effect resulting from the introduction of phosphorus, while in case said amount is more than this range, the pore volume of the alumina decreases too much. On the other hand, when the auxiliary component of the present invention is selected from alkaline earth metals and rare earth metals, the preferable amount of said auxiliary component introduced is in the range of 0.1-5 wt. % based on alumina and calculated as elementary metal.

In case said amount deviates from this range, expected results can never be obtained. When the auxiliary component of the present invention is selected from antimony, bismuth, boron, manganese and tin, the preferable amount of said auxiliary component introduced is in the range of 0.001-5 wt. % based on alumina amd calculated as elementary metal. In case said amount deviates from this range, expected results can never be obtained. The alumina particle in which the phosphorus has been introduced, with or without the auxiliary component, is then calcined at a temperature in the range of 250°-850° C. whereby the phosphorus component is fixed on the alumina particle, with or without the auxiliary component.

The crystalline aluminosilicate zeolite according to the present invention includes a synthetic Y-type zeolite, mordenite, a ZSM type zeolite, a natural zeolite and the like. These are used, as in the case of normal catalytic cracking catalysts, in the form ion-exchanged by the cation selected from hydrogen, ammonium and polyvalent metals. As the porous inorganic oxide, there may be used silica, silica-alumina, silica-magnesia and the like, and further there may be used also in the present invention a matrix component used usually in normal catalytic cracking catalysts.

The catalyst composition of the present invention may be prepared in the same manner as the method for preparing a usual crystalline aluminosilicate zeolite catalytic cracking catalyst except for using the above mentioned specific alumina particle. That is, the catalyst composition of the present invention can be prepared by adding the above mentioned specific alumina particle having a particle diameter of 10-60 $\mu$m and the crystalline aluminosilicate zeolite to the precursor slurry of a porous inorganic oxide matrix, for instance such as silica hydrosol, silica-alumina hydrosol and the like, dispersing uniformly and spray drying the resulting mixed slurry in a usual manner. The amounts of the precursor slurry of matrix, the specific alumina particle and the crystalline aluminosilicate zeolite used are controlled so that the finally obtained catalyst composition may contain the specific alumina particle in the range of 5-75 wt. %, the crystalline aluminosilicate zeolite in the range of 5-50 wt. % and the matrix in the range of 20-50 wt. % respectively. The spray dried particles are washed as occasion demands, and then dried again.

In the catalytic cracking operation of hydrocarbon oils, metallic contaminants such as vanadium, nickel and the like admixed in the feed oil deposit on the catalyst to deteriorate the catalytic activity and gasoline selectivity of the catalyst, and further the dehydrogenating reaction caused by said deposited metals conspicuously increases the amounts of coke and hydrogen produced. In particular, vanadium moves near the crystalline aluminosilicate zeolite in the catalyst regenerating atmosphere which is normally maintained at a temperature of 630° C. or more to thereby destroy its crystal structure.

In the catalytic cracking catalyst composition according to the present invention, wherein alumina particles having a particle diameter of 10-60 μm are dispersed as small lumps, metallic contaminants deposited on the catalyst are caught by said particles to aggregate thereon, and so do not disperse in the composition. Accordingly, deposited metals, in particular vanadium, are prevented from moving near the crystalline aluminosilicate zeolite even in the catalyst regenerating atmosphere maintained at 630° C. or more, and consequently, destruction of its crystal structure is also prevented. It is conjectured that the phosphorus fixed on the alumina particles accelerates aggregation of metals, such as vanadium, nickel and the like, caught on the alumina particles, and accelerates deactivation of these metals. And, when the auxiliary component selected from alkaline earth metals and rare earth metals is fixed on the alumina particles, it is conjectured from the test results of the inventors of the present invention that this auxiliary component possesses very strong affinity with metal oxides such as vanadium, nickel and the like. The ability of alumina particles to catch metallic contaminants deposited on the catalyst is accelerated more and more. When the auxiliary component of the present invention is selected from antimony, bismuth, boron, manganese and tin, this auxiliary component readily forms a solid solution with metals such as vanadium, nickel and the like, and consequently, markedly suppresses especially the dehydrating activity of nickel. Further, this auxiliary component, which is fixed on the alumina particles, has no possibility of obstructing the catalytic activity.

Thus, the catalyst composition of the present invention, even when a large amount of metallic contaminants deposit thereon, can maintain high catalytic activity and high gasoline selectivity, and can suppress the production of coke and hydrogen to small amounts.

Example 1

An aluminum hydroxide obtained by Bayer's process was calcined at 600° C. in the air for 2 hours. Then, 500 g of this calcined alumina was weighed. An aqueous phosphoric acid solution (115 ml) obtained by diluting 82 g of a 85% orthophosphoric acid with water was added to said calcined alumina and blended for 10 minutes. The phosphoric acid-added alumina particles were dried at 110° C. for 17 hours, and thereafter calcined at 600° C. for 1 hour, thereby preparing phosphorus-containing alumina particles. The average particle diameter of the phosphorus-containing alumina particles was 30 μm, the phosphorus content thereof was 4.0 wt. % (0.07 in terms of P/Al atomic ratio), and the specific surface area thereof was 67 m²/g respectively. A mixed slurry was obtained by adding 500 g of said phospho- rus-containing alumina particles to 4000 g of the silica hydrosol containing 5 wt. % of $SiO_2$ prepared by adding sulfuric acid to water glass, and further adding 300 g of a hydrogen ion-exchanged Y-type zeolite thereto. Then, this mixed slurry was spray dried, washed, and further dried to obtain a catalytic cracking catalyst composition of the present invention.

This catalyst composition contained 50 wt. % of the phosphorus-containing alumina particles, 30 wt. % of the H-Y zeolite and 20 wt. % of the silica derived from the matrix, and had the average particle diameter of 68 μm. This catalyst composition is named Catalyst A.

Comparative Example 1

This example relates to the usual catalyst described in U.S. Pat. No. 4,228,036. An aluminum sulfate solution was neutralized with ammonia water, and the resulting aluminum hydroxide precipitate was washed to remove by-product salt. A 85% ortho-phosphoric acid was added, while stirring, to this alumina hydrogel slurry corresponding to the amount of 450 g as $Al_2O_3$ so that the phosphorus content of the alumina became 4.0%, thereby obtaining a phosphorus-containing alumina hydrogel slurry. 6250 g of said phosphorus-containing alumina hydrogel slurry was added to 4000 g of a silica hydrosol having a $SiO_2$ concentration of 5 wt. % prepared by adding sulfuric acid to water glass, and further 300 g of H-Y zeolite was added thereto, thereby preparing a mixed slurry. Then, this slurry was spray dried in the same manner as Example 1, washed and further dried to thereby obtain a catalytic cracking catalyst composition.

This catalyst composition contained phosphorus and alumina in the total amount of 49.8 wt. %, 30.1 wt. % of H-Y zeolite and 20.1 wt. % of the silica derived from the matrix. This is named Catalyst B.

Comparative Example 2

This example relates to the usual catalyst corresponding to U.S. Pat. No. 4,430,199. A commercially available water glass No. 3 was diluted to thereby prepare a water glass solution having a $SiO_2$ concentration of 11.2%. A 10.5% aluminum sulfate solution was prepared separately. The water glass solution and the aluminum sulfate solution were mixed while pouring in a vessel in the ratios of 20 1/min. and 10 1/min. respectively, to thereby prepare a silica-alumina hydrogel slurry. This slurry was aged at 65° C. for 3.5 hours, and then a water glass solution was added thereto for adjusting the pH to 5.8 and stabilized. Thereafter, this slurry was added to H-Y zeolite so that the zeolite content of the final catalyst composition might become 30 wt. %. The obtained mixed slurry was spray dried in the same manner as Example 1, washed and dried to obtain a phosphorus-free catalyst composition.

Next, this catalyst was calcined at 600° C. for 1 hour, 200 g of this calcined catalyst was impregnated with 60 g of a 22% ortho-phosphoric acid aqueous solution having the pH of 3.5 adjusted with ammonia water, and thereafter dried to thereby obtain a phosphorus-containing catalyst composition.

TABLE 1

| Catalyst | Evaluation of metals tolerance | | | | | |
|---|---|---|---|---|---|---|
| | A | | B | | C | |
| Deposited metal amount | | | | | | |
| Ni ppm | 0 | 4000 | 0 | 4000 | 0 | 4000 |
| V ppm | 0 | 4000 | 0 | 4000 | 0 | 4000 |
| Activity evaluation | | | | | | |
| Conversion wt % | 59.8 | 45.1 | 67.5 | 39.0 | 57.2 | 20 |
| $C_5^+$ gasoline wt % | 45.7 | 32.1 | 47.1 | 26.5 | 43.8 | <15 |
| Coke wt % | 1.2 | 2.4 | 2.4 | 2.4 | 1.0 | — |
| Hydrogen wt % | 0.04 | 0.37 | 0.06 | 0.39 | 0.04 | — |

This catalyst contained 2.0 wt. % of phosphorus, 28.6 wt. % of H-Y zeolite, and 66.8 wt. % of silica-alumina. This catalyst is named Catalyst C.

Example 2 (Evaluation of catalytic performance)

The above mentioned Catalysts A–C were each subjected to performance evaluation using ASTM MAT.

First, for the purpose of investigating the metals tolerance of each catalyst, nickel and vanadium were deposited on each catalyst in the following manner.

This is, each catalyst had previously been calcined at 600° C. for 1 hour, was allowed to absorb a predetermined amount of benzene solution of nickel naphthenate and vanadium naphthenate, then dried at 110° C. and thereafter calcined at 600° C. for 1.5 hours. Therafter, each catalyst was steam deactivated by treating with 100% steam at 770° C. for 6 hours and calcining again at 600° C. for 1 hour. Each catalyst, on which nickel and vanadium had not been deposited, was treated with 100% steam at 770° C. for 6 hours, and calcined at 600° C. for 1 hour. The thus pretreated catalyst was subjected to evaluation tests using ASTM MAT. The obtained results are shown in Table-1.

The reaction conditions used herein are as shown below.

Feed oil: desulfurized vacuum gas oil
Reaction temperature: 482° C.
Space velocity: 16 hr−1
Catalyst/oil ratio: 3 (by weight)

TABLE 1

| Catalyst | Evaluation of metals tolerance | | | | | |
|---|---|---|---|---|---|---|
| | A | | B | | C | |
| Deposited metal amount | | | | | | |
| Ni ppm | 0 | 4000 | 0 | 4000 | 0 | 4000 |
| V ppm | 0 | 4000 | 0 | 4000 | 0 | 4000 |
| Activity evaluation | | | | | | |
| Conversion wt % | 59.8 | 45.1 | 67.5 | 39.0 | 57.2 | 20 |
| $C_5^+$ gasoline wt % | 45.7 | 32.1 | 47.1 | 26.5 | 43.8 | <15 |
| Coke wt % | 1.2 | 2.4 | 2.4 | 2.4 | 1.0 | — |
| Hydrogen wt % | 0.04 | 0.37 | 0.06 | 0.39 | 0.04 | — |

As shown in Table-1, Catalyst A corresponding to the catalyst composition of the present invention can maintain high cracking activity and high gasoline selectivity even when large amounts of metals have deposited thereon, and further, can suppress the production rate of coke an hydrogen to a low level in spite of its high cracking activity. In contrast with this, Catalyst B of Comparative Example 1 and Catalyst C of Comparative Example 2 are markedly inferior in the cracking activity and gasoline selectivity because of the deposition of large amounts of metals.

Next, metal-deposited Catalyst A and Catalyst B were investigated about the distribution of Al, Si and V in the catalyst particle using XMA. This measurement was made according to the method described in J. Japan Petrol. Inst., vol. 26, page 344 (1983). The obtained results are shown in FIG. 1 (Catalyst A) and FIG. 2 (Catalyst B).

Figure 2:
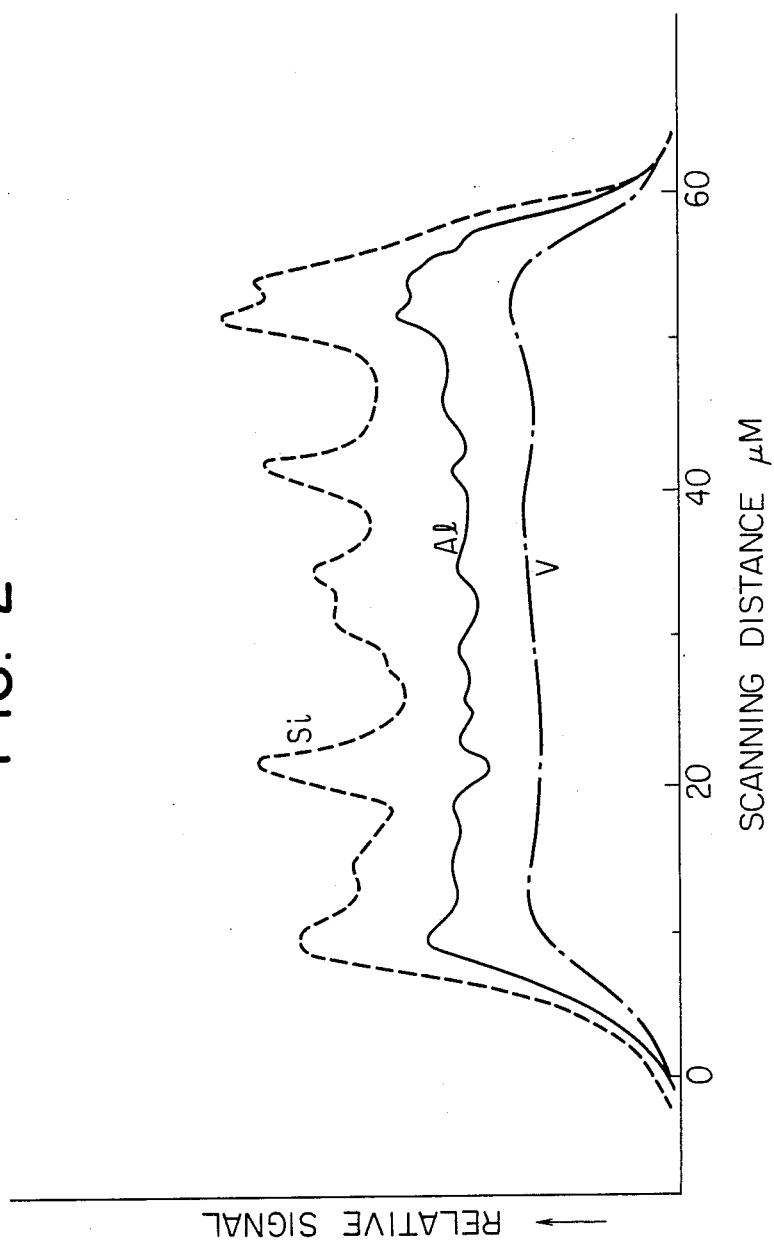
FIG. 2 is a graph obtained by analyzing Catalyst B, prepared in Comparative Example 1 and used in Example 2, by means of an X-ray microanalyzer.

As is evident from comparison of FIG. 1 with FIG. 2, in the case of Catalyst A, in which alumina was dispersed in the particle form, Al and V show substantially the same distribution, and this phenomenon establishes that V has selectively deposited on alumina. In the case of Catalyst B, whilst, it can be seen that V has uniformly deposited in the catalyst particle.

Example 3

The aluminum hydroxide (average particle diameter: 50 um) obtained by Bayer's process was treated with phosphoric acid in the same manner as Example 1 to thereby prepare phosphorus-containing alumina particles having the phosphorus contents of 0.008, 0.14 and 0.22 in terms of P/Al atomic ratio. These phosphorus-containing alumina particles were treated according to the same procedure as Example 1 to obtain Catalysts D, E and F containing 50 wt. % of the phosphorus-containing alumina particle, 30 wt. % of the H-Y zeolite and 20 wt. % of silica.

Next, predetermined amounts of nickel and vanadium were deposited on each of these catalysts according to the same method as Example 2. The metal-tolerance of each catalyst was evaluated under the same conditions as Example 2. The results are shown in Table-2. Catalyst D and Catalyst F, in which the P/Al atomic ratio of the phosphorus-containing alumina deviates from the range of 0.01–0.20, are inferior in gasoline yield and form more coke as compared with Catalyst E.

TABLE 2

| Catalyst | Evaluation of metals tolerance | | |
|---|---|---|---|
| | D | E | F |
| P/Al atomic ratio of phosphorus-containing alumina | 0.008 | 0.14 | 0.22 |
| Deposited metal amount | | | |
| Ni ppm | 3000 | 3000 | 3000 |
| V ppm | 3000 | 3000 | 3000 |
| Activity evaluation | | | |
| Conversion wt % | 47.5 | 47.9 | 41.1 |
| $C_5^+$ gasoline wt % | 33.6 | 35.2 | 30.6 |
| Coke wt % | 3.0 | 2.6 | 2.8 |
| Hydrogen wt % | 0.42 | 0.37 | 0.38 |

Example 4

An aqueous solution of $RECl_3$ corresponding to 2.1 wt. % as rare earth metal (RE) was added to the phosphorus-containing alumina particle (phosphorus content 4.0 wt. %, average particle diameter 30 μm) prepared in Example 1 and mixed, then dried at 110° C. for 17 hours and further calcined at 600° C. for 2 hours, hereby preparing an alumina particle on which the RE and phosphorus had fixed.

500 g of said RE-fixed phosphorus-containing alumina particle was added to 4000 g of a 5 wt. % $SiO_2$-containing silica hydrosol prepared by adding phosphoric acid to a water glass, and further 300 g of hydrogen ion-exchanged Y-type zeolite was added thereto to thereby prepare a mixed slurry. Then, this mixed slurry was spray dried, washed and further dried to obtain a catalytic cracking catalyst composition according to the present invention.

This catalyst composition contained 50 wt. % of the RE and phosphorus-fixed alumina particle, 30 wt. % of the H-Y zeolite, and 20 wt. % of silica derived from the matrix. This catalyst composition is named G.

Example 5

A catalyst composition was prepared according to the same manner as Example 4 except that an aqueous Mg (N₃)2 solution was used in place of the aqueous $RECl_3$ solution This catalyst composition contained 4.8 wt. % of $P_2O_5$, 1.2 wt. % of MgO and 44 wt. % of $Al_2O_3$. This catalyst is named Catalyst H.

Example 6

An aluminum hydroxide (average particle diameter 50 μm) obtained by Bayer's process was treated with phosphoric acid according to the same manner as Example 1 to thereby obtain a phosphorus-containing alumina particle, the phosphorus content of which was 8.5 wt. % (0.17 in terms of P/Al atomic ratio) of alumina. This phosphorus-containing alumina particle was added to an aqueous $CaCl_2$ solution corresponding to 2.1 wt. % as Ca, and processed in the same manner as Example 4 except that the aqueous $RECl_3$ solution was not employed, thereby obtaining a catalyst composition. This is named Catalyst I.

Comparative Example 3

An aluminum sulfate solution was neutralized with ammonia water, and the resulting aluminum hydroxide precipitate was washed to remove by-product salt. 78 g of a 85% ortho-phosphoric acid was added, while stirring, to this alumina hydrogel slurry corresponding to the amount of 440 g as $Al_2O_3$, and then an aqueous magnesium nitrate solution corresponding to 12.4 g as MgO was added thereto.

4000 g of a silica hydrosol ($SiO_2$ concentration 5 wt. %) prepared by adding sulfuric acid to water glass was added to said slurry, and further 300 g of H-Y zeolite was added thereto to thereby prepare a mixed slurry. Then this slurry was spray dried according to the same manner as Example 1, washed and further dried to thereby obtain a catalytic cracking catalyst composition.

This catalyst composition contained 4.8 wt. % of $P_2O_5$, 1.2 wt. % of MgO and 44 wt. % of $Al_2O_3$. This is named Catalyst J.

Example 7 (Evaluation of catalyst performance)

The above mentioned Catalysts G–J and Catalyst A obtained by Example 1 were subjected to performance evaluation using ASTM MAT in the exactly same manner as described in Example 2. The obtained results are shown in Table-3.

gen ion-exchanged Y-type zeolite to prepare a mixed slurry. Then, this mixed slurry was spray dried, washed and further dried to obtain a catalytic cracking catalyst composition according to the present invention.

This catalyst composition contained 50 wt. % of the antimony and phosphorus-fixed alumina particle, 30 wt. % of H-Y zeolite and 20 wt. % of the silica derived from the matrix. This catalyst composition is named Catalyst K.

Example 9

A catalyst composition was prepared in the same manner as Example 8 except that an aqueous $Bi(NO_3)_2$ solution corresponding to 1.2 wt. % as Bi was used in place of the aqueous $SbCl_3$ solution. This catalyst composition contained 4.61 wt. % of $P_2O_5$, 0.67 wt. % of $Bi_2O_3$ and 44.7 wt. % of $Al_2O_3$. This catalyst composition is named Catalyst L.

Comparative Example 4

An aluminum sulfate solution was neutralized with ammonia water, and the resulting aluminum hydroxide precipitates were washed to remove by-product salt. 90 g of a 85% ortho-phosphoric acid was added while stirring to this alumina hydrogel slurry corresponding to 490 g as $Al_2O_3$. This slurry was added to 4000 g of silica hydrosol ($SiO_2$ concentration 5 wt. %) prepared by adding sulfuric acid to water glass and further added with 300 g of a H-Y zeolite to thereby prepare a mixed slurry. Then, this slurry was spray dried in the same manner as Example 1. This spray-dried composition was dipped in an aqueous $SbCl_3$ solution (50° C.) for 10 minutes, thereafter washed with water and dried to obtain a catalytic cracking catalyst composition.

This catalyst composition contained 4.92 wt. % of $P_2O_5$, 0.72 wt. % of $Sb_2O_3$ and 43.5 wt. % of $Al_2O_3$.

TABLE 3

| Catalyst | Evaluation of metals tolerance | | | | | | | | | |
|---|---|---|---|---|---|---|---|---|---|---|
| | G | | H | | I | | A | | J | |
| Deposited metal amount | | | | | | | | | | |
| Ni ppm | 0 | 3000 | 0 | 3000 | 0 | 3000 | 0 | 3000 | 0 | 3000 |
| V ppm | 0 | 3000 | 0 | 3000 | 0 | 3000 | 0 | 3000 | 0 | 3000 |
| Activity evaluation | | | | | | | | | | |
| Conversion wt % | 62.2 | 54.5 | 60.5 | 53.1 | 62.8 | 53.5 | 59.8 | 48.4 | 65.7 | 30.5 |
| $C_5^+$ gasoline wt % | 48.1 | 39.2 | 46.0 | 38.2 | 47.9 | 38.7 | 45.7 | 35.6 | 47.0 | 22.0 |
| Coke wt % | 1.6 | 2.7 | 1.4 | 2.6 | 1.5 | 2.6 | 1.2 | 2.6 | 2.4 | 2.0 |
| Hydrogen wt % | 0.04 | 0.29 | 0.04 | 0.28 | 0.04 | 0.31 | 0.04 | 0.36 | 0.05 | 0.38 |

As shown in Table-3, Catalysts G, H and I, according to the present invention, are high in the conversion after nickel and vanadium have deposited, are high in gasoline yield, and form low amounts of coke and hydrogen, as compared with the catalyst J comprising the matrix in which MgO, $P_2O_5$, $Al_2O_3$ and $SiO_2$ have uniformly dispersed and the zeolite.

Example 8

An aqueous $SbCl_3$ solution corresponding to 1.2 wt. % as Sb was added to the phosphorus-containing alumina particle (phosphorus content 4.0 wt. %, average particle diameter 30 μm) in Example 1 and stirred, thereafter dried at 110° C. for 17 hours, and further calcined at 600° C. for 2 hours, thereby preparing an alumina particle on which antimony and phosphorus had fixed.

500 g of said antimony-fixed phosphorus-containing alumina particle was added to 4000 g of a 5 wt. % $SiO_2$-containing silica hydrosol prepared by adding sulfuric acid to water glass, and further adding 300 g of a hydro- This catalyst composition is named Catalyst M.

Example 10 (Evaluation of catalyst performance)

The above mentioned Catalysts K–M and Catalyst A obtained by Example 1 were subjected to performance evaluation using ASTM MAT.

First, for the purpose of investigating the metal tolerance thereof, nickel alone or both nickel and vanadium were deposited on samples of each catalyst in the following manner. That is, each catalyst had previously been calcined at 600° C. for 1 hour, thereafter was allowed to absorb a predetermined amount of benzene solution of nickel naphthenate or benzene solution of nickel naphthenate and vanadium naphthenate, then dried at 110° C. and thereafter calcined at 600° C. for 1.5 hours. Thereafter, each catalyst was steam deactivated by treating with 100% steam at 770° C. for 6 hours and calcined again at 600° C. for 1 hour. Samples of each catalyst, on which nickel and vanadium had not been deposited, were treated with 100% steam at 770° C. for 6 hours and then calcined at 600° C. for 1 hour.

The thus pretreated catalysts were subjected to evaluation tests under the same conditions described in Example 2 using ASTM MAT. The obtained results are shown in Table-4.

TABLE 4

| Catalyst | \multicolumn{3}{c}{K} | \multicolumn{3}{c}{L} | \multicolumn{3}{c}{A} | \multicolumn{3}{c}{M} |
|---|---|---|---|---|---|---|---|---|---|---|---|---|
| \multicolumn{13}{l}{Evaluation of metals tolerance} |
| Deposited metal amount | | | | | | | | | | | | |
| Ni ppm | 0 | 5000 | 2000 | 0 | 5000 | 2000 | 0 | 5000 | 2000 | 0 | 5000 | 2000 |
| V ppm | 0 | 0 | 4000 | 0 | 0 | 4000 | 0 | 0 | 4000 | 0 | 0 | 4000 |
| Activity evaluation | | | | | | | | | | | | |
| Conversion wt % | 59.0 | 58.3 | 50.9 | 59.4 | 57.1 | 51.1 | 59.8 | 56.6 | 48.4 | 61.8 | 55.8 | 42.5 |
| $C_5^+$ gasoline wt % | 45.1 | 39.0 | 37.3 | 45.5 | 38.3 | 36.8 | 45.7 | 36.3 | 35.2 | 47.6 | 33.9 | 30.0 |
| Coke wt % | 1.2 | 2.9 | 2.5 | 1.2 | 3.0 | 2.6 | 1.2 | 4.0 | 2.9 | 1.4 | 3.9 | 3.1 |
| Hydrogen wt % | 0.04 | 0.21 | 0.22 | 0.04 | 0.23 | 0.25 | 0.04 | 0.40 | 0.36 | 0.04 | 0.37 | 0.29 |

As shown in Table-4, Catalysts K and L according to the present invention are high in conversion and gasoline yield after nickel and vanadium have deposited, and form low amounts of coke and hydrogen as compared with Catalyst M prepared by impregnating the antimony compound on catalyst comprising the matrix in which $P_2O_5$, $Al_2O_3$ and $SiO_2$ have been uniformly mixed. In addition, Catalysts K and L are high in conversion and gasoline yield as compared with Catalyst A which contains no auxiliary component.

Example 11

This Example shows the influences exerted by the particle diameters of alumina particles impregnated with a phosphorus component.

An aluminum hydroxide (average particle diameter: 60 microns) obtained by Bayer's process was calcined at 600° C. in air for 2 hours to obtain a calcined alumina (a).

Then, part of said calcined alumina (a) was ground to obtain alumina particles having an average particle diameter of 3 microns. 500 g of the alumina particles was weighed. An aqueous phosphoric acid solution (115 ml) obtained by diluting 82 g of a 85% orthophosphoric acid with water was added to said alumina particles and blended for 10 minutes. The phosphoric acid-added alumina particles were dried at 110° C. for 17 hours, and thereafter calcined at 600° C. for 1 hour, thereby preparing phosphorus-containing alumina particles. The average particle diameter of the phosphorus-containing alumina particles was 3 microns, and the phosphorus content thereof was 4.0 wt. % (0.07 in terms of P/Al atomic ratio).

A mixed slurry was obtained by adding 500 g of the phosphorus-containing alumina particles to 4000 g of a silica hydrosol containing 5 wt. % of $SiO_2$ prepared by adding sulfuric acid to water glass, and further adding 300 g of a hydrogen ion-exchanged Y-type crystalline aluminosilicate (zeolite). Then, this mixed slurry was spray dried, washed and further dried to obtain a catalytic cracking catalyst composition of the present invention.

This catalyst composition contained 50 wt. % of the phosphorus-containing alumina particles, 30 wt. % of the H-Y zeolite and 20 wt. % of the silica derived from the matrix, and had an average particle diameter of 62 microns. This catalyst composition is named Catalyst N.

In accordance to the same procedure ss described above, part of the calcined alumina (a) was ground to prepare alumina particles having an average alumina particle diameter of 10 microns, 15 microns and 20 microns respectively. By using said alumina particles respectively and in accordance to the same procedure as described above, there were prepared catalyst compositions containing 50 wt. % of the phosphorus-containing alumina particles, 30 wt. % of the H-Y zeolite and 20 wt. % of the silica derived from the matrix. Those catalysts are named 0, P and Q respectively.

The above-mentioned catalysts N–Q were each subjected to performance evaluation using ASTM MAT.

First, for the purpose of investigating the metal tolerance of each catalyst, nickel and vanadium were deposited on samples of each catalyst in the following manner. That is, samples of each catalyst were previously calcined at 600° C. for 1 hour, and then were allowed to absorb a predetermined amount of benzene solution of nickel naphthenate and vanadium naphthenate, then dried at 110° C. and thereafter calcined at 600° C. for 1.5 hours. Thereafter, each catalyst was deactivated by treating with 100% steam at 770° C. for 6 hours, and calcined at 600° C. for 1 hour.

The thus pretreated catalysts were each subjected to evaluation tests using ASTM MAT. The obtained results are shown in Table 5 and FIG. 3 together with the results of Catalyst A and Catalyst B.

The reaction conditions used herein are as shown below:

Feed oil : desulfurized vacuum gas oil
Reaction temperature: 482° C.
Space velocity : 16 hr$^{-1}$
Catalyst/oil ratio : 3 (by weight)

TABLE 5

| Catalyst | B | | N | | O | | P | | Q | | A | |
|---|---|---|---|---|---|---|---|---|---|---|---|---|
| \multicolumn{13}{l}{Evaluation of Metals Tolerance} |
| Diameter of phosphorus-containing alumina particle, micron | \multicolumn{2}{c}{—} | \multicolumn{2}{c}{3} | \multicolumn{2}{c}{10} | \multicolumn{2}{c}{15} | \multicolumn{2}{c}{20} | \multicolumn{2}{c}{30} |
| Deposited metal amount | | | | | | | | | | | | |
| Ni ppm | 0 | 4000 | 0 | 4000 | 0 | 4000 | 0 | 4000 | 0 | 4000 | 0 | 4000 |
| V ppm | 0 | 4000 | 0 | 4000 | 0 | 4000 | 0 | 4000 | 0 | 4000 | 0 | 4000 |
| Activity evaluation | | | | | | | | | | | | |
| Conversion wt. % | 67.5 | 39.0 | 61.5 | 40.5 | 60.3 | 41.6 | 60.6 | 43.8 | 60.5 | 44.5 | 59.8 | 45.1 |
| $C_5^+$ gasoline wt. % | 47.1 | 26.5 | 45.9 | 30.1 | 45.1 | 30.6 | 45.7 | 31.9 | 45.6 | 32.1 | 45.7 | 32.1 |
| Coke wt. % | 2.4 | 2.4 | 1.2 | 2.4 | 1.2 | 2.4 | 1.2 | 2.4 | 1.2 | 2.3 | 1.2 | 2.4 |

TABLE 5-continued

| Catalyst | Evaluation of Metals Tolerance | | | | | | | | | | | |
|---|---|---|---|---|---|---|---|---|---|---|---|---|
| | B | | N | | O | | P | | Q | | A | |
| Hydrogen wt. % | 0.06 | 0.39 | 0.04 | 0.41 | 0.04 | 0.39 | 0.04 | 0.37 | 0.04 | 0.37 | 0.04 | 0.37 |

Figure 3:
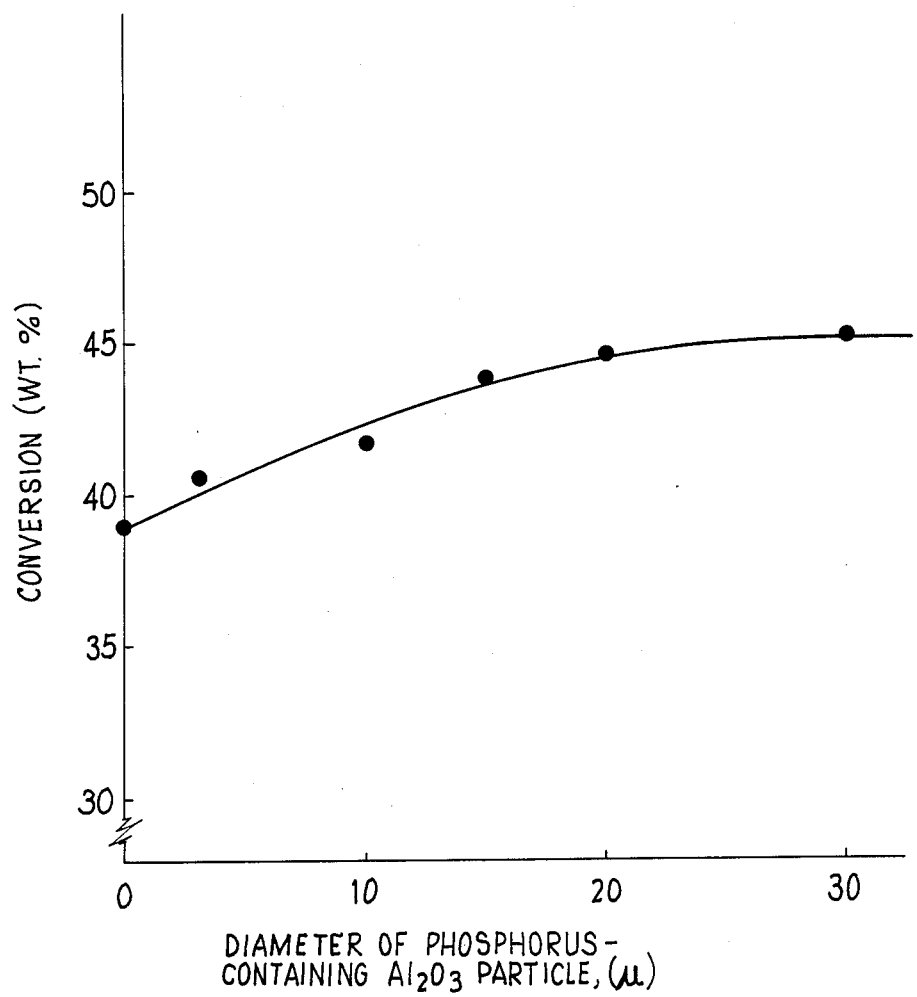
FIG. 3 as a graph plotting the conversion of the feed oil, using nickel and vanadium-deposited catalysts, against the diameters of phosphorus-containing alumina particles of said catalysts.

FIG. 3 is a view plotting the conversion of the feed oil, using nickel and vanadium-deposited catalysts, against the diameters of phosphorus-containing alumina particles of said catalysts.

As is seen from Table 5 and FIG. 3, the conversion of the feed oil, using the nickel and vanadium-deposited catalysts increases as the diameter of phosphorus-containing alumina particles of the catalysts increases.

conducted by the use of an aqueous rare earth chloride solution in place of the aqueous magnesium chloride solution. The RE content in this catalyst was 2.1 wt. % in terms of oxide.

Catalyst R and Catalyst S were subjected to performance evaluation in the same procedure as used in the aforesaid Example 11.

The obtained results are shown in Table-6 together with the results of Catalyst G and Catalyst H.

TABLE 6

| Catalyst | Evaluation of Metals Tolerance | | | | | | | |
|---|---|---|---|---|---|---|---|---|
| | R | | S | | H | | G | |
| Auxiliary component | Mg | | RE | | Mg | | RE | |
| Deposited metal amount | | | | | | | | |
| Ni ppm | 0 | 3000 | 0 | 3000 | 0 | 3000 | 0 | 3000 |
| V ppm | 0 | 3000 | 0 | 3000 | 0 | 3000 | 0 | 3000 |
| Activity evaluation | | | | | | | | |
| Conversion wt. % | 65.3 | 40.8 | 66.4 | 45.9 | 60.5 | 53.1 | 62.2 | 54.5 |
| $C_5^+$ gasoline wt. % | 47.5 | 33.0 | 47.9 | 35.0 | 49.0 | 38.2 | 48.1 | 39.2 |
| Coke wt. % | 1.9 | 2.0 | 2.1 | 2.6 | 1.4 | 2.6 | 1.6 | 2.7 |
| Hydrogen wt. % | 0.04 | 0.39 | 0.04 | 0.39 | 0.04 | 0.28 | 0.04 | 0.29 |

Example 12

This Example shows the use of an auxiliary component-incorporated zeolite in the place of incorporating said auxiliary component in alumina particles impregnated with a phosphorus component.

An aluminum hydroxide obtained by Bayer's process was calcined at 600° C. in air for 2 hours. Then, 500 g of this calcined alumina was weighed. An aqueous phosphoric acid-solution (115 ml) obtained by diluting 82 g of a 85% orthophosphoric acid with water was added to said calcined alumina and blended for 10 minutes. This phosphoric acid-added alumina particle was dried at 110° C. for 17 hours, and thereafter calcined at 600° C. for 1 hours, thereby preparing phosphorus-containing alumina particles. The average particle diameter of the phosphorus-containing alumina particles was 30 microns, and the phosphorus content thereof was 4.0 wt. % (0.07 in terms of P/Al atomic ratio).

On the other hand, an ammonium-exchanged Y-type zeolite was ion-exchanged with an aqueous magnesium chloride solution by a conventional manner, thereby obtaining Y-type zeolite having an exchange rate of magnesium of 42.3%.

Then, 4000 g of a silica hydrosol having a $SiO_2$ concentration of 5 wt. % prepared by adding sulfuric acid to water glass was added with 500 g of said phosphorus-containing alumina particle, and further with 300 g of said magnesium-exchanged Y-type zeolite, thereby preparing a mixed slurry. Then this mixed slurry was spray dried, washed and further dried to thereby obtain a catalytic cracking catalyst composition. This catalyst composition contained 50 wt. % of the phosphorus-containing alumina particle, 30 wt. % of the magnesium-exchanged Y-type zeolite and 20 wt. % of the silica derived from the matrix, and the amount of MgO in this catalyst was 1.1 wt. %. This is named Catalyst R.

Catalyst S was prepared by the exactly same procedure as that employed in the preparation of said Catalyst R excepting the use of a RE-exchanged Y-type zeolite (exchange rate: 25.6%) whose ion exchange was Catalyst H and Catalyst G of the present invention which comprise incorporating such auxiliary components as magnesium and rare earth components in alumina particles impregnated with a phosphorus component are observed to exhibit a higher conversion of the feed oil, using nickel and vanadium-deposited catalysts, then Catalyst R and Catalyst S that use the zeolites ion-exchanged with such auxiliary components as magnesium and rare earth components.

We claim:

1. A catalyst composition for the catalytic cracking of hydrocarbons, which comprises:
    a porous inorganic oxide matrix containing mixed therein (1) particles of crystalline aluminosilicate zeolite and (2) alumina particles having a particle diameter of from 15 to 60 μm and impregnated with a phosphorus component.

2. A catalyst composition according to claim 1, wherein said alumina particles have a P/Al atomic ratio in the range of 0.01-0.20.

3. A catalyst composition according to claim 1, consisting essentially of from 5 to 75 wt. % of said alumina particles, from 5 to 50 wt. % of said crystalline aluminosilicate zeolite particles and from 20 to 50 wt. % of said porous inorganic oxide matrix.

4. A catalyst composition according to claim 1, which has been prepared by contacting alumina or alumina hydrate particles with a solution of a phosphorus compound having a phosphoric ion to impregnate said alumina particles with said phosphorus compound, then calcining said alumina particles at from 250° to 850° C., then mixing said alumina particles with said zeolite particles and with an aqueous slurry containing a precursor of said porous inorganic oxide matrix, and then drying said slurry to obtain said catalyst composition.

5. A catalyst composition according to claim 1, in which said porous inorganic oxide matrix is selected from the group consisting of silica, silica-alumina and silica-magnesia. magnesia.

6. A catalyst composition for the catalytic cracking of hydrocarbons, which comprises:
   a porous inorganic oxide matrix containing mixed therein (1) particles of crystalline aluminosilicate zeolite and (2) alumina particles having a particle diameter of from 15 to 60 μm and impregnated with (a) a phosphorus component and (b) at least one auxiliary component selected from the group consisting of alkaline earth metals, rare earth metals, antimony, bismuth, boron, manganese and tin.

7. A catalyst composition according to claim 6, wherein said auxiliary component is selected from the group consisting of alkaline earth metals and rare earth metals, and the amount of said auxiliary component deposited on the alumina particles is in the range of 0.1–5 wt. % of the alumina particles.

8. A catalyst composition according to claim 6, wherein the auxiliary component is selected from the group consisting of antimony, bismuth, boron, manganese and tin, and the amount of the auxiliary component deposited on the alumina particles is in the range of 0.001–5 wt. % of the alumina particles.

9. A catalyst composition according to claim 6, wherein said alumina particles have a P/Al atomic ratio in the range of 0.01–0.20.

10. A catalyst composition according to claim 6, consisting essentially of from 5 to 75 wt. % of said alumina particles, from 5 to 50 wt. % of said crystalline aluminosilicate zeolite particles and from 20 to 50 wt. % of said porous inorganic oxide matrix.

11. A catalyst composition according to claim 6, which has been prepared by contacting alumina or alumina hydrate particles with a solution of a phosphorus compound having a phosphoric ion and the same or a different solution containing a compound of said auxiliary component to impregnate said alumina particles with said compounds, then calcining said alumina particles at from 250° to 850° C., then mixing said alumina particles with said zeolite particles and with an aqueous slurry containing precursor of said porous inorganic oxide matrix, and then drying said slurry to obtain said catalyst composition.

12. A catalyst composition according to claim 6, in which said porous inorganic oxide matrix is selected from the group consisting of silica, silica-alumina and silica-magnesia.

13. A method for preparing a catalyst composition for the catalytic cracking of hydrocarbons, which comprises the steps of mixing (a) alumina particles having a particle diameter of from 15 to 60 μm and impregnated with a phosphorus compound, with (b) particles of crystalline aluminosilicate zeolite and with (c) an aqueous slurry of a precursor of a porous inorganic oxide matrix to form a catalyst slurry; and then spray-drying the catalyst slurry.

14. A method for preparing a catalyst composition for the catalytic cracking of hydrocarbons, which comprises the steps of mixing (a) alumina particles having a particle diameter of from 15 to 60 μm and impregnated with a phosphorus compound and with at least one auxiliary component selected from the group consisting of alkaline earth metals, rare earth metals, antimony, bismuth, boron, manganese and tin, with (b) particles of crystalline aluminosilicate zeolite and with (c) an aqueous slurry of a precursor of a porous inorganic oxide matrix to form a catalyst slurry; and then spray drying the catalyst slurry.

* * * * *